United States Patent [19]
Vetter

[11] Patent Number: 5,000,308
[45] Date of Patent: Mar. 19, 1991

[54] CABLE CONVEYOR FOR LIGHT LOADS, IN PARTICULAR GARMENTS

[75] Inventor: Wolfgang Vetter, Hamm, Fed. Rep. of Germany

[73] Assignee: Johannes Gerhardes Christianus Geerts, Bentveld, Netherlands

[21] Appl. No.: 407,455

[22] Filed: Sep. 14, 1989

[30] Foreign Application Priority Data

Oct. 5, 1988 [DE] Fed. Rep. of Germany ....... 3833824

[51] Int. Cl.$^5$ .............................................. B65G 17/32
[52] U.S. Cl. .................................. 198/678.1; 198/685
[58] Field of Search ...................... 198/678, 465.4, 804, 198/685

[56] References Cited

U.S. PATENT DOCUMENTS

| 982,654 | 1/1911 | Adam | 198/685 |
| 3,164,245 | 1/1965 | Juengel | 198/678 X |
| 3,338,375 | 8/1967 | Evans | 198/685 X |

FOREIGN PATENT DOCUMENTS

| 0216420 | 12/1960 | Austria | 198/678 |
| 94915 | 1/1897 | Fed. Rep. of Germany . | |
| 0870374 | 1/1953 | Fed. Rep. of Germany | 198/678 |
| 1950151 | 10/1969 | Fed. Rep. of Germany . | |
| 0548277 | 9/1956 | Italy | 198/678 |

Primary Examiner—H. Grant Skaggs
Assistant Examiner—D. Glenn Dayoan
Attorney, Agent, or Firm—Lalos & Keegan

[57] ABSTRACT

A cable conveyor for transporting hanging light loads such as garments suspended on hangers, said conveyor comprising a mainly horizontal active flight and a non-active return flight said active flight being supported by a number of carrying rollers and being giuded by leading rollers engaging the active flight from above, the conveyor further comprising a frame upon which the rollers are mounted, said frame being embodied as an extrusion profile in the interior of which at least the active flight as well as the carrying rollers and the leading rollers are accommodated.

3 Claims, 2 Drawing Sheets

CABLE CONVEYOR FOR LIGHT LOADS, IN PARTICULAR GARMENTS

BACKGROUND OF THE INVENTION

This invention relates to a cable conveyor for light loads in particular for garments suspended on hangers. Cable conveyors are simple devices for transporting light loads and do not necessitate any dogs, cars, trolleys and the like load pushing or carrying members. The cable of such a conveyor is at the same time the pulling- and carrying element for the loads.

DISCUSSION OF THE PRIOR ART

Cable conveyors for coat hangers are known per se, in which a number of small rollers are used for carrying the load supporting flight, viz that portion of the cable upon which the garments are suspended and are consequently advanced forwardly and guided. These load carrying rollers are lying in a row and are evenly spaced quite close to each other. At greater distances, the load carrying flight of the cable is guided from above by leading rollers which are supported vertically above the row of carrying rollers. The circulating cable is endless and is driven by a motor. There are further leading rollers supporting and guiding the backward moving empty cable portion, viz the flight which does not carry any load. In the conventional cable conveyor entire number of supporting points for the rollers are screwed or otherwise secured upon a carrying tube having a round, square or rectangular cross section, said tube forming the frame of the conveyor.

It is a disadvantage of such cable conveyors that its structure and its mounting is rather complicated, whilst further the free running cable is dangerous for the operator. Consequently the invention aims at providing a cable conveyor which has a simple structure and which is easy to mount. It is further advisable that the cable should not travel along an easy accessible path.

SUMMARY OF THE INVENTION

The cable conveyor according to the invention comprises a supporting frame for the carrying- and leading rollers of the cable, said frame being embodied in an extrusion profile which at the same time functions as supporting beam for the conveyor. The supports for the leading rollers carrying the empty flight may either be incorporated into the extrusion profile, or may be separately mounted upon the profile.

The advantages of the invention are to be found in the mainly closed profile which takes up the supporting points for the carrying- and leading rollers, and which is at the same time the frame (the backbone) for the cable conveyor. The majority of the rollers can easily be incorporated into the extrusion profile, prior to the introduction of the cable, so that the extra time required for mounting and adjusting of the many carrying rollers as well as of the leading rollers is avoided. A further advantage consists in that the load carrying and pulling flight is running within the profile and is consequently protected. The danger for accidents as occured in previous freely moving cable conveyors, is considerably diminished. The empty flight of the cable travels upon a level which does not present any danger for the persons working with this conveyor.

SURVEY OF THE DRAWINGS

DESCRIPTION OF PREFERRED EMBODIMENTS

Figure 1:
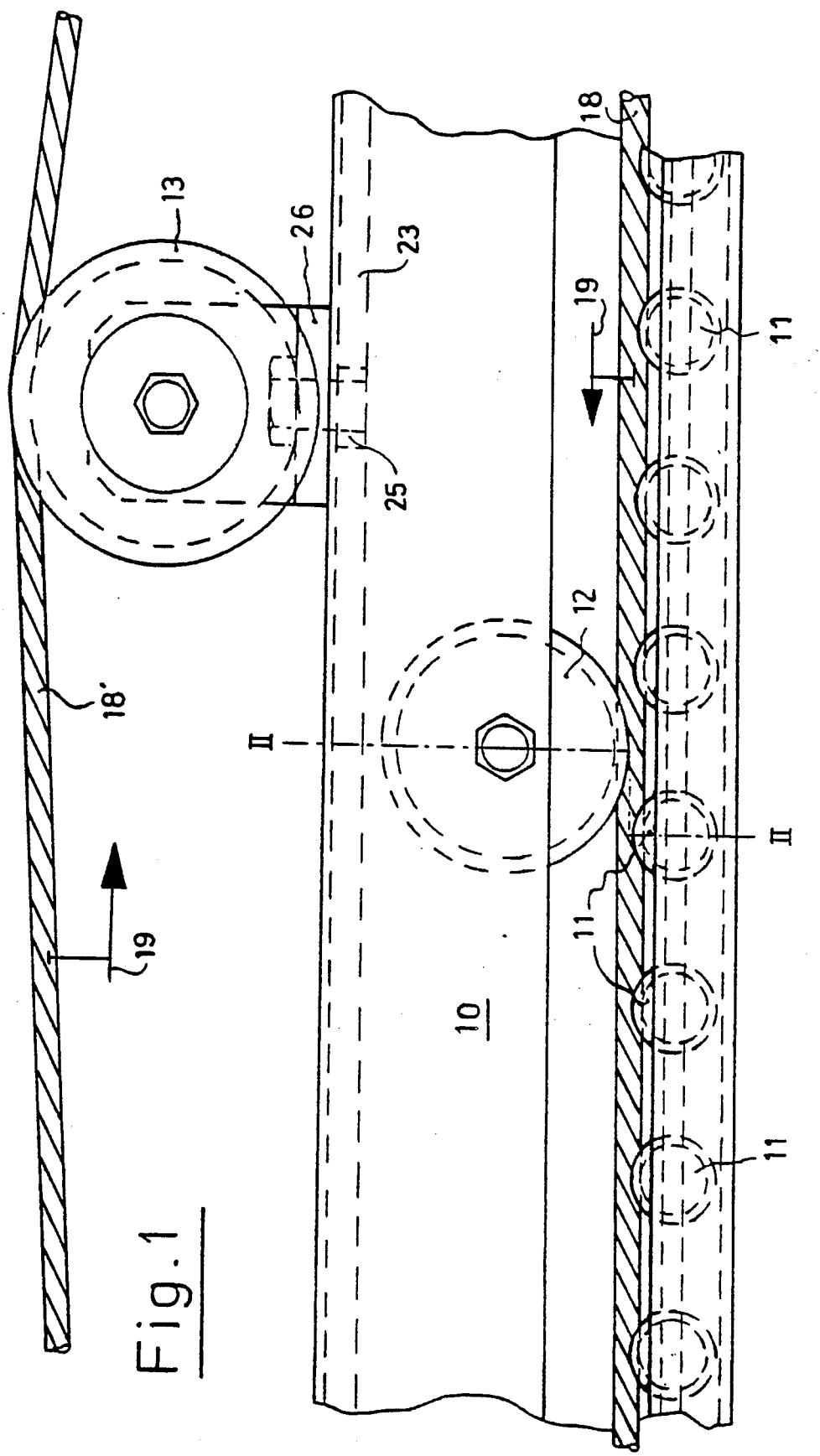
FIG. 1 is a elevational side view of a portion of the cable conveyor.

The cable conveyor consists of an extrusion profile 10, the carrying rollers 11 (FIG. 1 and 2) and 14 (FIG. 3) and the leading rollers 12 (FIG. 2) and 13 (FIG. 1). The carrying rollers 11, 14 may be shaped symmetrical, vide FIG. 2, or can be embodied non-symmetrical as shown in FIG. 3. It is further possible to support the carrying rollers 11 and 14 only at one side 15, vide FIG. 2 or on both sides 16 shown in FIG. 3. The carrying rollers 11, 14 may be supported by ball bearings or may be provided with short axes which are either cast, moulded or obtained by injection. These axes are supported in plastic bearings 17 (FIG. 3). The rollers 11, 12, 13 and 14 have a concave outer rim.

The conveyor is provided with an endless cable 18 which is driven in the direction of the arrow 19. The active flight of the conveyor is supported by a great number of carrying rollers 11 or 14 so as to guide the cable 18 along the intended path of travel. Upon the upperside of the cable flight 18 there is a reduced number of leading rollers 12. Upon this active flight 18 of the conveyor, a number of coat hangers 20 are distributed, which hangers are travelling together with the cable. The position of the leading rollers 12 is chosen such that these rollers are always in contact with an unsupported part of the flight 18 (vide FIG. 1). The coat hangers 12 with the garments (not shown) are travelling in the direction of the lower arrow 19.

The return flight 18' of the cable is guided at a substantial distance above the lower active flight 18 and is supported by a small number of leading rollers 13. Consequently this return flight 18' is moving on a level which is not accessible for the hands of the operator dealing with the coat hangers 20.

Figure 2:
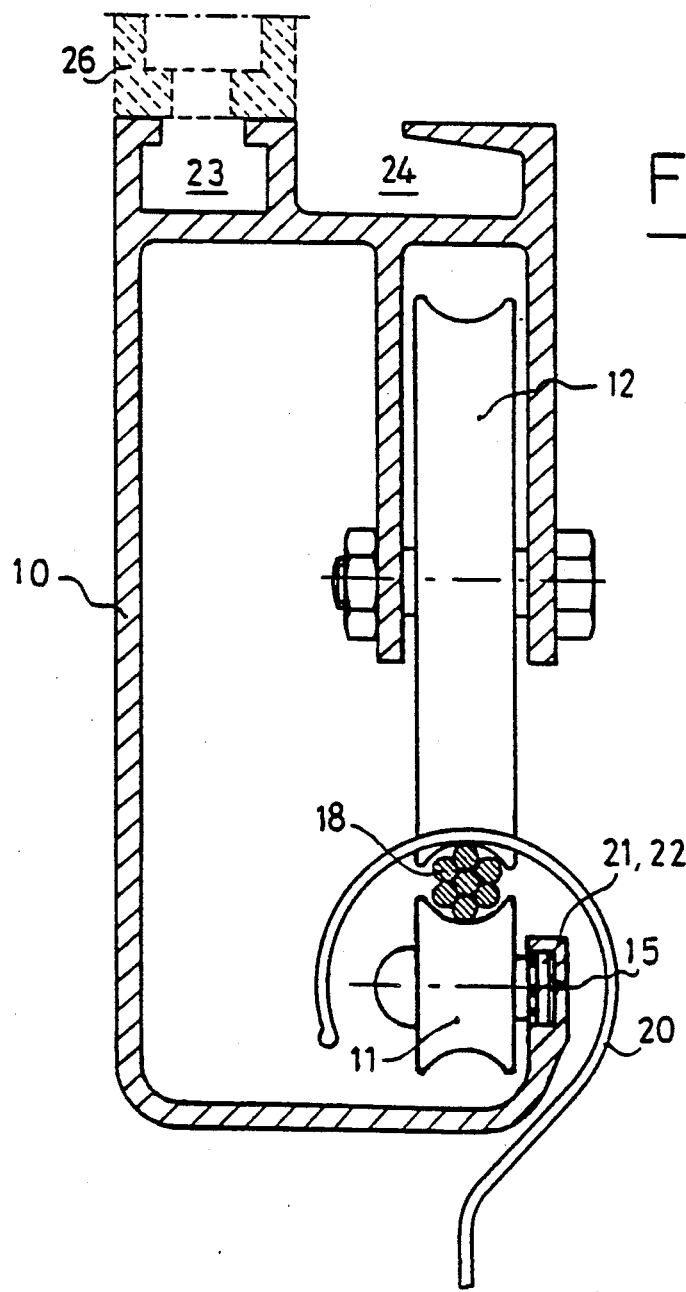
FIG. 2 is a cross-section of the extrusion profile according to the line II—II in FIG. 1.
Figure 3:
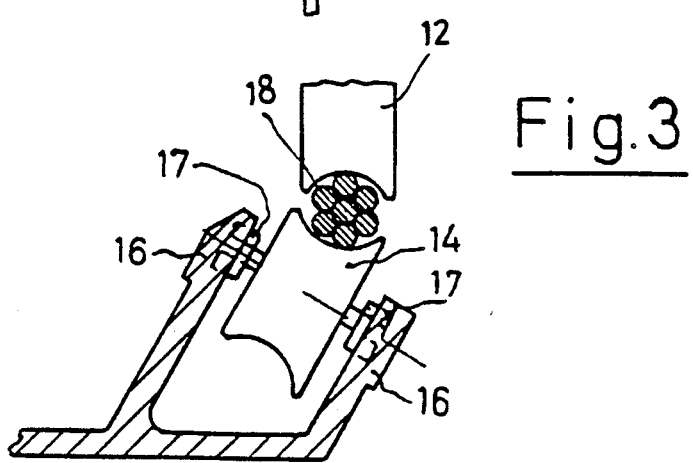
FIG. 3 is a different embodiment for the lower portion of FIG. 2.

The carrying roller 11 shown in FIG. 2 is unilaterally supported in the side 15 of the profile, which side has a C-shaped groove 21 at the innerside of the profile lying parallel to the longitudinal direction of the profile 10. In this groove or channel 21, each roller 11 is mounted by means of a nut 22. The profile 10 is at its upper portion provided with a C-shaped channel 23 and a neighbouring channel 24.

The channel 23 is used for taking up the head of a bolt 25 (vide FIG. 1) for securing a mounting element 26 upon the profile beam 10. Each leading roller 13 is supported in such a mounting element 26. The channel 24 can be used for accomodating any electrical conducts or pressure fluid hoses which may be required for the operation of the cable conveyor.

What is claimed is:

1. A cable conveyor for light loads, in particular for garment hangers, comprising an endless cable with an active flight and non-active return flight, a carrying beam having mounted thereon lower carrying rollers for supporting the active flight of the cable, said beam consisting of a hollow extrusion profile having a C-shaped cross-section, a series of said lower carrying rollers and a series of upper leading rollers being mounted for rotation within said extrusion profile and the latter rollers being staggered with respect to the lower carrying rollers.

2. A cable conveyor according to claim 1, in which the extrusion profile includes an upper portion externally shaped with a U-shaped channel for rotatably mounting at least one of said upper leading rollers for supporting said non-active return flight of the cable.

3. A cable conveyor according to claim 1, in which said lower carrying rollers for said active flight of the cable have their axis non-parallel with the axis of each said upper leading roller, said lower carrying rollers having a non-symmetrical outer profile to compensate for the inclined position of the axis of said lower carrying roller.

* * * * *